US012562903B2

(12) United States Patent
Haddad et al.

(10) Patent No.: US 12,562,903 B2
(45) Date of Patent: Feb. 24, 2026

(54) SECURING MULTI-PATH TCP (MPTCP) WITH WireGuard PROTOCOL

(71) Applicant: Telefonaktiebolaget LM Ericsson (publ), Stockholm (SE)

(72) Inventors: Wassim Michel Haddad, Palo Alto, CA (US); Heikki Mahkonen, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

(21) Appl. No.: 18/292,895

(22) PCT Filed: Aug. 2, 2021

(86) PCT No.: PCT/IB2021/057059
§ 371 (c)(1),
(2) Date: Jan. 26, 2024

(87) PCT Pub. No.: WO2023/012502
PCT Pub. Date: Feb. 9, 2023

(65) Prior Publication Data
US 2024/0364515 A1 Oct. 31, 2024

(51) Int. Cl.
*H04L 9/30* (2006.01)
*H04L 12/46* (2006.01)
*H04L 45/24* (2022.01)

(52) U.S. Cl.
CPC ............ *H04L 9/30* (2013.01); *H04L 12/4633* (2013.01); *H04L 45/24* (2013.01)

(58) Field of Classification Search
CPC ........ H04L 9/30; H04L 12/4633; H04L 45/24
See application file for complete search history.

(56) References Cited

U.S. PATENT DOCUMENTS 11,310,146 B1 * 4/2022 Kaciulis .............. H04L 63/0428
2020/0128112 A1 * 4/2020 Li ........................... H04L 69/22
(Continued)

FOREIGN PATENT DOCUMENTS

KR 20200007189 A 1/2020

OTHER PUBLICATIONS

"WireGuard: fast, modern, secure VPN tunnel", accessed on Nov. 2, 2020 at https://www.wireguard.com/.
(Continued)

*Primary Examiner* — Mohamed A. Wasel
(74) *Attorney, Agent, or Firm* — Nicholson De Vos Webster & Elliott LLP

(57) ABSTRACT

A method of a server to establish secure multipath communications between the server and a user device includes establishing a WireGuard connection with the user device, establishing a first sub flow of a multipath transmission control protocol (MPTCP) connection with the user device using a first WireGuard virtual private network (VPN) tunnel, the first sub flow having a first path, sending a message to initiate a second path between the server and the user device, the message including a WireGuard interface address, public key for the server, and WireGuard indicator, receiving a reply message with a public key for the user device, and establishing a second sub flow of the MPTCP connection with the user device using a second WireGuard VPN tunnel, the second sub flow having the second path.

16 Claims, 11 Drawing Sheets

(56)          References Cited

U.S. PATENT DOCUMENTS

| | | | | | |
|---|---|---|---|---|---|
| 2021/0136040 | A1* | 5/2021 | Mestery | .............. | H04L 63/0272 |
| 2021/0328832 | A1* | 10/2021 | Norbutas | ............ | H04L 12/4633 |
| 2023/0013356 | A1* | 1/2023 | Vagelos | ................ | H04W 12/71 |

OTHER PUBLICATIONS

A. Ford et al., "RFC 8684: TCP Extensions for Multipath Operation with Multiple Addresses," Mar. 2020, pp. 1-68, Internet Engineering Task Force (IETF).
Konrad-Felix Krentz et al., "Poster: Multipath Extensions for WireGuard," 2021, pp. 1-4, IFIP Networking Conference.

* cited by examiner

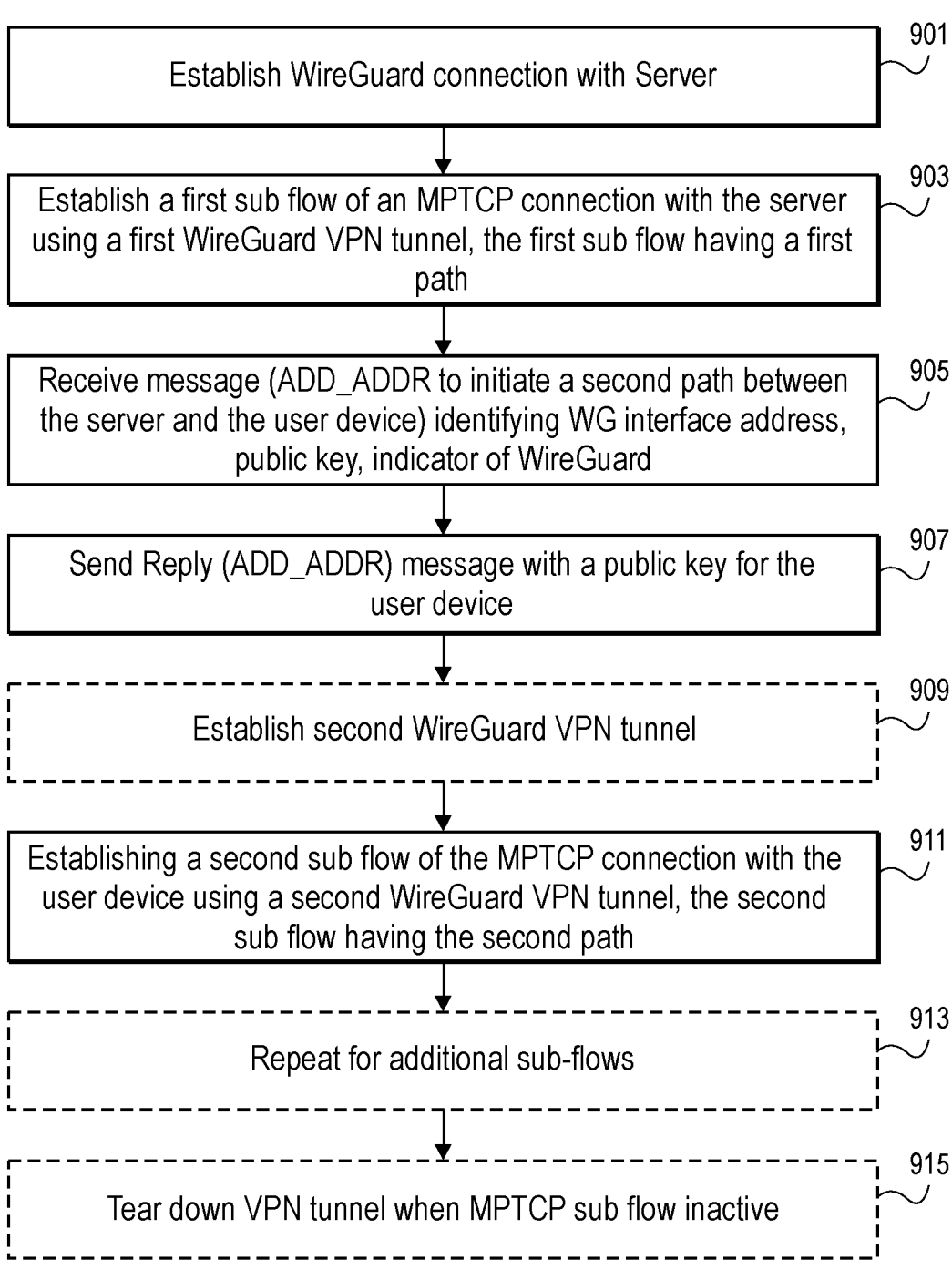

901 Establish WireGuard connection with Server

903 Establish a first sub flow of an MPTCP connection with the server using a first WireGuard VPN tunnel, the first sub flow having a first path 905 Receive message (ADD_ADDR to initiate a second path between the server and the user device) identifying WG interface address, public key, indicator of WireGuard 907 Send Reply (ADD_ADDR) message with a public key for the user device 909 Establish second WireGuard VPN tunnel 911 Establishing a second sub flow of the MPTCP connection with the user device using a second WireGuard VPN tunnel, the second sub flow having the second path 913 Repeat for additional sub-flows 915 Tear down VPN tunnel when MPTCP sub flow inactive

FIG. 9

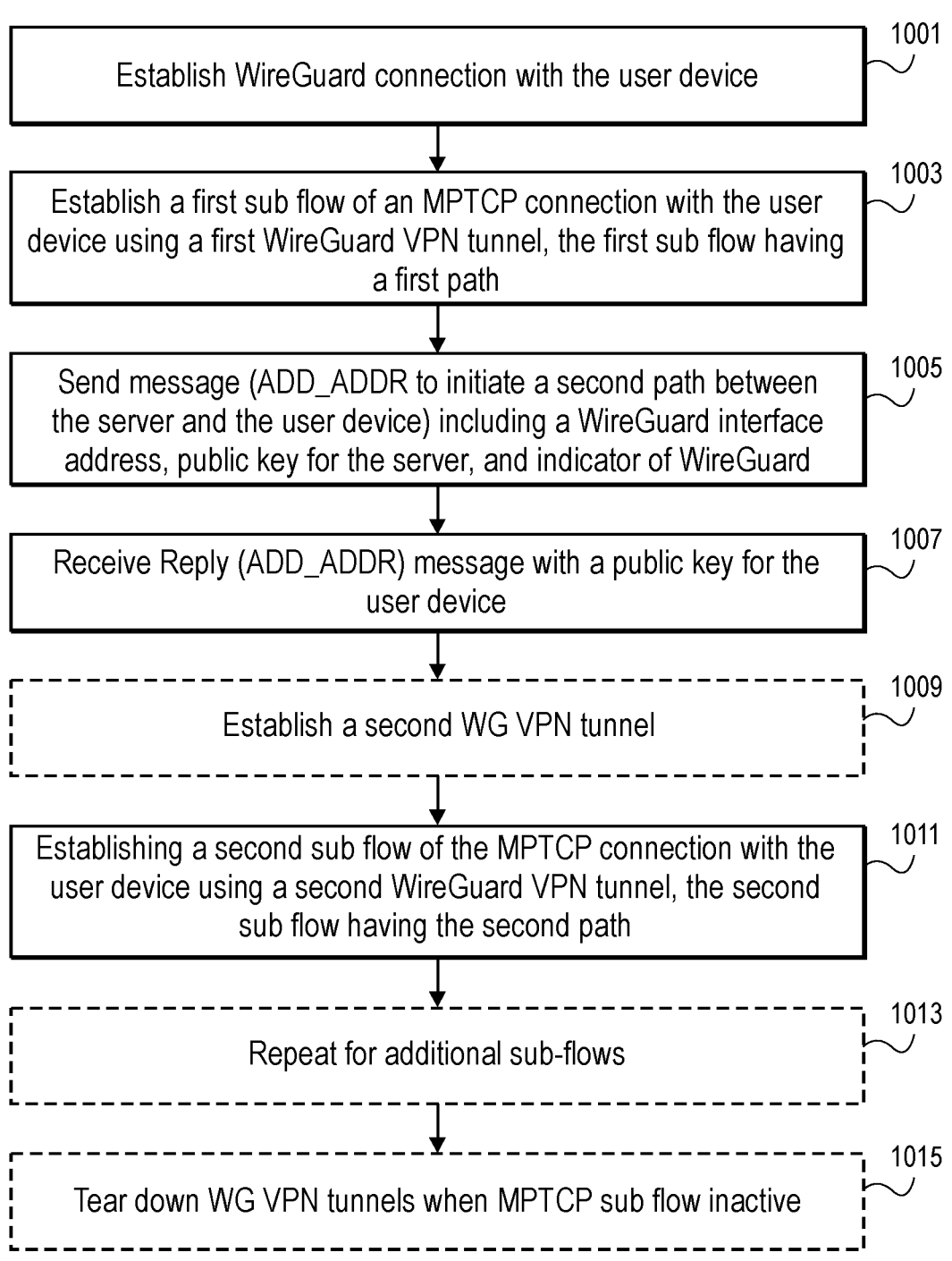

1001

Establish WireGuard connection with the user device

1003

Establish a first sub flow of an MPTCP connection with the user device using a first WireGuard VPN tunnel, the first sub flow having a first path

1005

Send message (ADD_ADDR to initiate a second path between the server and the user device) including a WireGuard interface address, public key for the server, and indicator of WireGuard

1007

Receive Reply (ADD_ADDR) message with a public key for the user device

1009

Establish a second WG VPN tunnel

1011

Establishing a second sub flow of the MPTCP connection with the user device using a second WireGuard VPN tunnel, the second sub flow having the second path

1013

Repeat for additional sub-flows

1015

Tear down WG VPN tunnels when MPTCP sub flow inactive

PHYSICAL DEVICES AND
PHYSICAL CONNECTIVITY

SPECIAL PURPOSE
HARDWARE

NETWORK FUNCTION
VIRTUALIZATION (NFV)

SPECIAL PURPOSE NETWORK DEVICE   1102

VIRTUAL NETWORK   ND
ELEMENT(S)   CONTROL
1130A  •••  1130R   PLANE
1124

1122

NETWORKING SOFTWARE INSTANCE(S)

CONTROL
COMMUNICATION
AND CONFIG. MOD.
1132A

1132R

FORWARDING
TABLE(S) 1134A

1134R

PROCESSORS
1112

1110

FORWARDING RESOURCE(S)
1114

PHYSICAL NIS   1116

NETWORKING HARDWARE

NON-TRANSITORY MACHINE
READABLE STORAGE MEDIA
1118

NETWORKING SOFTWARE
1120

SECURE MPTCP
COMPONENT
1165

ND
FORWARDING PLANE

1126

GENERAL PURPOSE (COTS)
NETWORK DEVICE 1104

HYBRID
NETWORK
DEVICE
1106

VIRTUAL NETWORK
ELEMENT(S)
1160A  •••  1160R

1162A

1162R

APP(S)
1164A

APP(S)
1164R

SOFTWARE INSTANCE(S)

1152

VIRTUALIZATION LAYER
1154

PROCESSOR(S)
1142

1140

PHYSICAL NIS
1146

HARDWARE

NON-TRANSITORY
MACHINE READABLE
STORAGE MEDIA
1148

SOFTWARE 1150

SECURE MPTCP
COMPONENT
1165

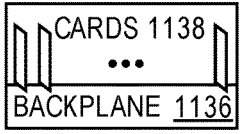

CARDS 1138
•••
BACKPLANE 1136

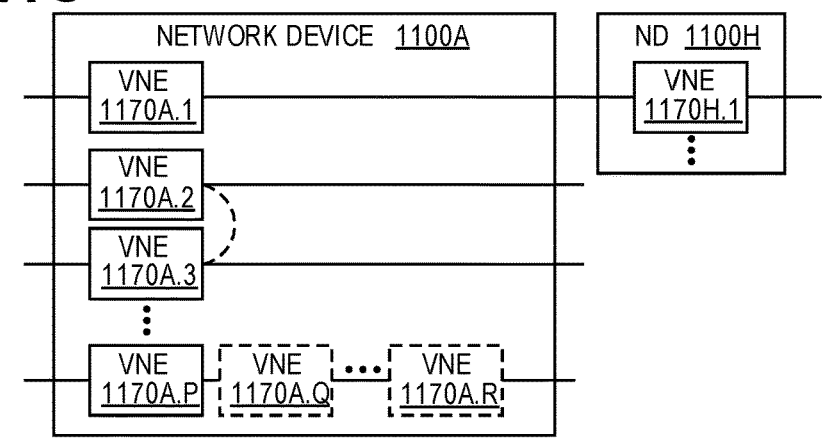

NETWORK DEVICE 1100A

VNE 1170A.1

VNE 1170A.2

VNE 1170A.3

VNE 1170A.P     VNE 1170A.Q  ....  VNE 1170A.R

ND 1100H

VNE 1170H.1

FIG. 11D

CENTRALIZED APPROACH (SDN) 1174

DISTRIBUTED APPROACH 1172

...

APPLICATION(S) 1188     APPLICATION LAYER 1186

NORTH BOUND INTERFACE 1184

VIRTUAL NETWORK(S) 1192     CENTRALIZED CONTROL PLANE 1176

NETWORK CONTROLLER 1178

CENTRALIZED REACHABILITY AND FORWARDING INFO. MOD. 1179

SECURE MPTCP COMPONENT 1181

...     SOUTH BOUND INTERFACE 1182

DATA PLANE 1180

SINGLE VNE 1170T

ND 1100A

VNE 1170A.1

ND 1100H

VNE 1170H.1

SECURING MULTI-PATH TCP (MPTCP) WITH WireGuard PROTOCOL

CROSS-REFERENCE TO RELATED APPLICATIONS

This application is a National stage of International Application No. PCT/IB2021/057059, filed Aug. 2, 2021, which is hereby incorporated by reference.

TECHNICAL FIELD

Embodiments of the invention relate to the field of multi-path communication sessions; and more specifically, to a process and system for securing multi-path communication sessions.

BACKGROUND ART

Multipath communication involves the use of multiple independent pathways across a network or set of networks to communicate between two endpoint electronic devices. However, support in existing communication protocols can be limited. Multipath transmission control protocol (MPTCP) is one protocol that supports multipath communication. MPTCP is a protocol developed and managed by the Internet Engineering Task Force (IETF) Multipath TCP working group. MPTCP expands the operation of TCP to support connections that use multiple paths to maximize resource usage and increase redundancy. MPTCP enables inverse multiplexing of resources and increases TCP throughput to the sum of all available link-level channels instead of using a single one as required by TCP.

Multipath TCP can be used in wireless networks, including wireless networks that include both Wi-Fi and mobile communication network protocols (e.g., 5G and 4G LTE). In MPTCP paths can be added or dropped to adjust bandwidth and redundancy, for example, if a user device moves within the coverage offered by a mobile communication network, new paths can be added or old paths dropped without disrupting the end-to-end TCP connection with the user device. MPTCP can also be utilized in data centers. Multipath TCP can balance a single TCP connection across multiple interfaces and reach very high throughput.

However, MPTCP causes a number of new issues. From a network security perspective, multipath routing causes cross-path data fragmentation that results in firewalls and malware scanners becoming inefficient because they can only see one path's traffic in an MPTCP session. In addition, secure socket layer (SSL) decryption becomes inefficient due to the end-to-end encryption protocols. Thus, a mechanism for the efficient and secure operation of multi-path communication is not available for MPTCP.

SUMMARY

In one embodiment, a method of a server to establish secure multipath communications between the server and a user device includes establishing a WireGuard connection with the user device, establishing a first sub flow of a multipath transmission control protocol (MPTCP) connection with the user device using a first WireGuard virtual private network (VPN) tunnel, the first sub flow having a first path, sending a message to initiate a second path between the server and the user device, the message including a WireGuard interface address, public key for the server, and WireGuard indicator, receiving a reply message with a public key for the user device, and establishing a second sub flow of the MPTCP connection with the user device using a second WireGuard VPN tunnel, the second sub flow having the second path.

In another embodiment, an electronic device includes a machine-readable storage medium having stored therein a secure MPTCP component, and a set of processors coupled to the machine-readable storage medium, at least one of the set of processors to execute the secure MPTCP component to perform a process including establishing a WireGuard connection with the user device, establishing a first sub flow of a MPTCP connection with the user device using a first WireGuard VPN tunnel, the first sub flow having a first path, sending a message to initiate a second path between the server and the user device, the message including a WireGuard interface address, public key for the server, and WireGuard indicator, receiving a reply message with a public key for the user device, and establishing a second sub flow of the MPTCP connection with the user device using a second WireGuard VPN tunnel, the second sub flow having the second path.

In a further embodiment, a machine-readable medium includes computer program code which when executed by a computer carries out a method of establishing a WireGuard connection with the user device, establishing a first sub flow of a MPTCP connection with the user device using a first WireGuard VPN tunnel, the first sub flow having a first path, sending a message to initiate a second path between the server and the user device, the message including a WireGuard interface address, public key for the server, and WireGuard indicator, receiving a reply message with a public key for the user device, and establishing a second sub flow of the MPTCP connection with the user device using a second WireGuard VPN tunnel, the second sub flow having the second path.

In one embodiment, a method of a user device to establish secure multipath communications between a server and the user device includes establishing a WireGuard connection with the server, establishing a first sub flow of a MPTCP connection with the server using a first WireGuard VPN tunnel, the first sub flow having a first path, receiving a message to initiate a second path between the server and the user device, the message including a WireGuard interface address, public key for the server, and WireGuard indicator, sending a reply message with a public key for the user device, and establishing a second sub flow of the MPTCP connection with the server using a second WireGuard VPN tunnel, the second sub flow having the second path.

In another embodiment, an electronic device includes a machine-readable storage medium having stored therein a secure MPTCP component, and a set of processors coupled to the machine-readable storage medium, at least one of the set of processors to execute the secure MPTCP component to perform a process including establishing a WireGuard connection with the server, establishing a first sub flow of a MPTCP connection with the server using a first WireGuard VPN tunnel, the first sub flow having a first path, receiving a message to initiate a second path between the server and the user device, the message including a WireGuard interface address, public key for the server, and WireGuard indicator, sending a reply message with a public key for the user device, and establishing a second sub flow of the MPTCP connection with the server using a second WireGuard VPN tunnel, the second sub flow having the second path.

In a further embodiment, a machine-readable medium includes computer program code which when executed by a computer carries out the method of establishing a Wire-Guard connection with the server, establishing a first sub flow of a MPTCP connection with the server using a first WireGuard VPN tunnel, the first sub flow having a first path, receiving a message to initiate a second path between the server and the user device, the message including a Wire-Guard interface address, public key for the server, and WireGuard indicator, sending a reply message with a public key for the user device, and establishing a second sub flow of the MPTCP connection with the server using a second WireGuard VPN tunnel, the second sub flow having the second path.

BRIEF DESCRIPTION OF THE DRAWINGS

The invention may best be understood by referring to the following description and accompanying drawings that are used to illustrate embodiments of the invention. In the drawings:

FIG. 9 is a flowchart of one embodiment of a process of a user device for secure management of multipath communication.

FIG. 10 is a flowchart of one embodiment of a process of a server for secure management of multipath communication.

FIG. 11A illustrates connectivity between network devices (NDs) within an exemplary network, as well as three exemplary implementations of the NDs, according to some embodiments of the invention.

FIG. 11B illustrates an exemplary way to implement a special-purpose network device according to some embodiments of the invention.

FIG. 11C illustrates various exemplary ways in which virtual network elements (VNEs) may be coupled according to some embodiments of the invention.

FIG. 11D illustrates a network with a single network element (NE) on each of the NDs, and within this straight-forward approach contrasts a traditional distributed approach (commonly used by traditional routers) with a centralized approach for maintaining reachability and for-warding information (also called network control), according to some embodiments of the invention.

FIG. 11E illustrates the simple case of where each of the NDs implements a single NE, but a centralized control plane has abstracted multiple of the NEs in different NDs into (to represent) a single NE in one of the virtual network(s), according to some embodiments of the invention.

FIG. 11F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
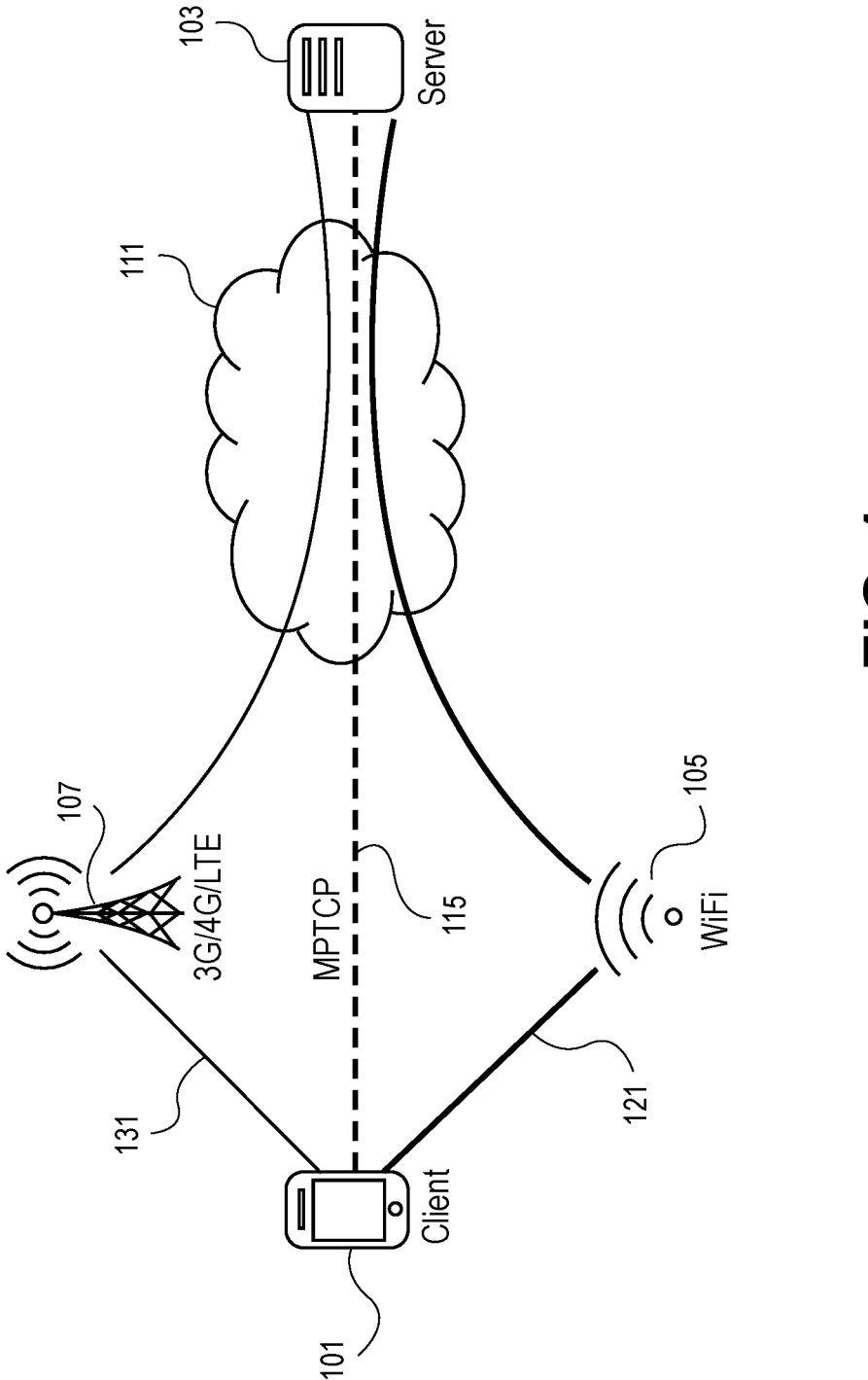
FIG. 1 is a diagram of one embodiment of an example network utilizing multipath transmission control protocol (MPTCP).

The following description describes methods and apparatus for managing multipath communication. In particular the method and apparatus manage multipath securely using tunneling. In example embodiments, the multipath transmission protocol (MPTCP) is utilized to establish multiple paths between user devices and servers. WireGuard or similar protocols are utilized to dynamically establish tunnels for each path between the user device and server. While examples are given herein with relation to the use of multipath communication between a user device and a server, those skilled in the art would appreciate that any two electronic devices can utilize the embodiments for multipath communication.

In the following description, numerous specific details such as logic implementations, opcodes, means to specify operands, resource partitioning/sharing/duplication imple-mentations, types and interrelationships of system compo-nents, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or char-acteristic. Moreover, such phrases are not necessarily refer-ring to the same embodiment. Further, when a particular feature, structure, or characteristic is described in connection with an embodiment, it is submitted that it is within the knowledge of one skilled in the art to affect such feature, structure, or characteristic in connection with other embodi-ments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/ or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/ or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a diagram of one embodiment of an example network utilizing multipath transmission control protocol (MPTCP). FIG. 1 provides an example application of MPTCP between a user device 101 and a server 103. MPTCP and the embodiments can be utilized to connect any two electronic devices. The user device 101 and server 103 are provided by way of example and not limitation. MPTCP can be used in combination with any tunneling protocol or similar mechanism. The example of the use of WireGuard is provided herein by way of example and not limitation; other similar protocols and systems can be used in place of or in combination with WireGuard.

In the example, the client 101 can be connected with the server 103 via any number of intermediate electronic devices using any combination of media and technologies. In the illustrated example, the user device 101 is connected with the server 103 via both Wi-Fi 105 and $3^{rd}$ generation partnership project (3GPP) 107 (e.g., 3G, 4G long term evolution (LTE), or 5G technologies) networks. In addition, the intermediate Wi-Fi 105 and 3GPP 107 networks can connect with an Internet Protocol (IP) or core network 111 or set of such networks to provide a communication path between the user device 101 and the server 103.

The user device 101 and server 103 can be connected via MPTCP. MPTCP is a TCP extension that enables an electronic device that supports MPTCP to send data over multiple paths to a destination electronic device that supports MPTCP, where the MPTCP connection 115 functions as a single connection. Each path between the two electronic devices with an established MPTCP connection 115 can be referred to as a sub-flow. In the illustrated example, a first sub-flow 131 provides a path between the user device 101 and the server 103 via a 3GPP network 107. A second sub-flow 121 provides a path between the user device 101 and the server 103 via a Wi-Fi network 105. Both paths can traverse the IP or core network 111 although the respective paths through the IP or core network 111 can differ.

The embodiments utilize the concepts of MPTCP, which includes a way to build a connection between two electronic devices (e.g., hosts) and not between two interfaces (as standard TCP does). For example, a user, Alice, can have a user device 101 (e.g., a smartphone) with 3G/4G and Wi-Fi interfaces. These interfaces have separate IP addresses (e.g., the 3G/4G interface can have a first IP address 10.11.12.13 and the Wi-Fi interface can have an IP address 10.11.12.14). Another user (Bob) can have a user device 101 that is a computer with an Ethernet interface (e.g., with IP address 20.21.22.23).

In standard TCP, the TCP connection is established between two IP addresses. Each TCP connection is identified by a four-tuple (source and destination IP addresses and ports). Given this restriction, an application at the user device 101 can only create one TCP connection through a single link with a program at the server 103. Multipath TCP allows the connection to use several paths simultaneously. For this example, MPTCP creates one TCP connection, i.e., a first sub-flow 121, over the Wi-Fi interface and a second sub-flow 131 over the 3G/4G interface.

MPTCP defines operations (e.g., as defined in IETF Request for Comments (RFC) 6824) to handle when and how to add/remove paths, to be compatible with legacy TCP hardware (such as some firewalls that can automatically reject TCP connections if the sequence numbers aren't successive), to define a fair congestion control strategy between the different links and the different hosts (especially with those that don't support MPTCP).

MPTCP adds new mechanisms to TCP transmissions including the sub-flow system, used to gather multiple standard TCP connections (the paths from one device to another). Sub-flows are identified during a TCP three-way handshake. After the handshake, an application can add or remove some sub-flows (e.g., subtypes 0x3 and 0x4). The MPTCP digital signature standard (DSS) option contains a data sequence number and an acknowledgement number. These allow receiving data from multiple sub-flows to be handled in the original order, without any corruption (e.g., message subtype 0x2), and a modified retransmission protocol handles congestion control and reliability.

While MPTCP provides these additional functions for managing of sub flows, MPTCP does not provide a mechanism to efficiently secure the multiple paths while maintaining the coherence of the data transmitted across the different sub-flows. In the example embodiments, WireGuard is utilized to provide secure tunneling of the sub-flows of the MPTCP connection. WireGuard is a secure network tunnel operating at layer 3 and can be implemented as a kernel virtual network interface. In other embodiments, other secure tunneling protocols can be used such as IPsec, OpenVPN protocols, or similar technologies. The virtual tunnel interface of WireGuard is based on an association between a peer public key and a tunnel source IP address. WireGuard can use a single round trip key exchange and handles all sessions transparently to the user using a timer state machine mechanism. Transport speed is accomplished using ChaCha20Poly 1305 authenticated encryption for encapsulation of packets in user datagram protocol (UDP).

WireGuard implements encrypted virtual private networks (VPNs), and provides case of use, high speed performance, and a low attack surface. WireGuard provides better performance and more power-saving than IPsec, OpenVPN, and similar tunneling protocols. The WireGuard protocol passes traffic over UDP.

The embodiments provide a process for combining MPTCP with WireGuard or similar protocols for improved security while maintaining high efficiency, performance, and power savings. The embodiments encapsulate each MPTCP sub-flow in a separate WireGuard VPN tunnel. The embodiments provide a WireGuard-based mechanism to secure MPTCP signaling exchange as well as data encryption.

Figure 2:
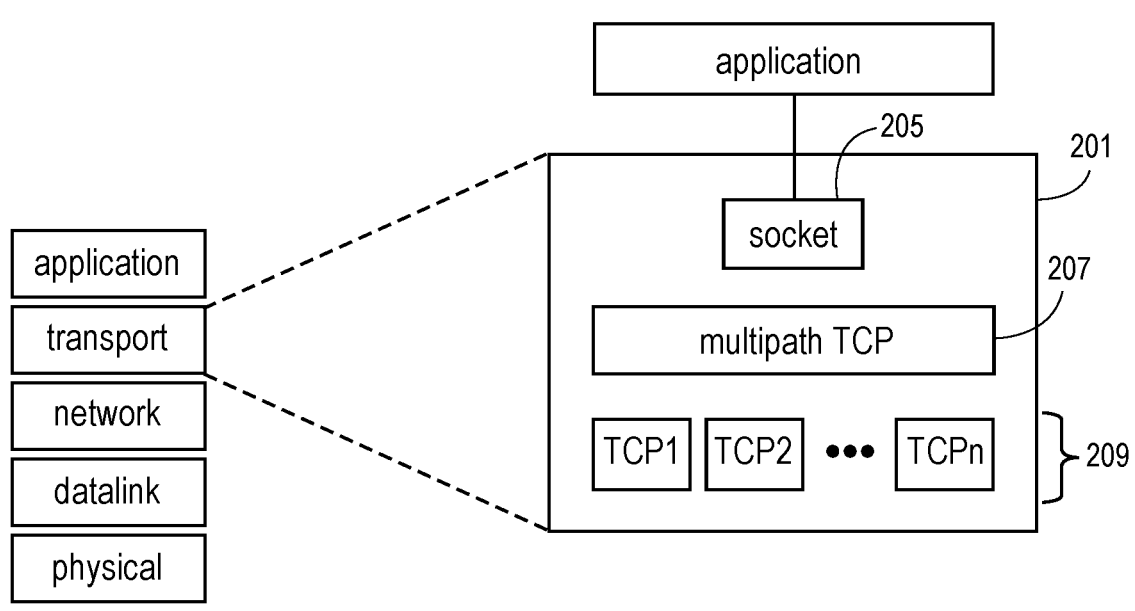
FIG. 2 is a diagram of one embodiment of the components of secure MPTCP.

FIG. 2 is a diagram of one embodiment of the components of secure MPTCP. The diagram illustrates the placement of the embodiments of secure MPTCP 201 in the Open Systems Interconnection (OSI) model. Each participating electronic device implements the OSI model including a physical layer, datalink layer, network layer, transport layer, and application layer. In the embodiments, the secure MPTCP 201 is part of the transport layer.

The secure MPTCP 201 interfaces with an application via a socket 205 or similar interface. The application can establish an MPTCP connection with a destination electronic device via the secure MPTCP 201 in the same manner that a connection is established for MPTCP 207. Each sub-flow 209 is a separate TCP connection such that any number of sub-flows 209 can be established for each MPTCP connection 207.

Figure 3:
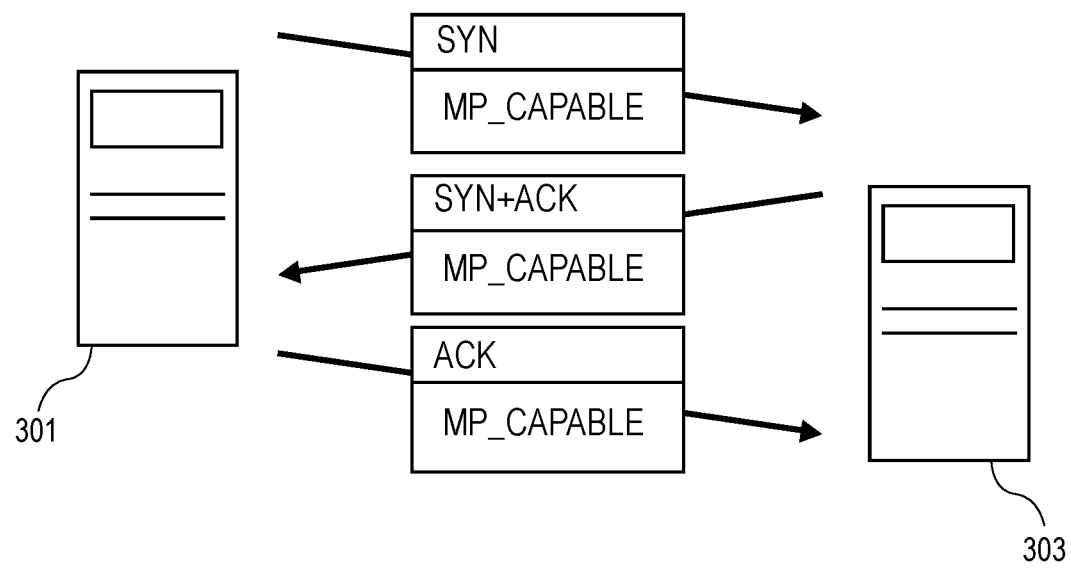
FIG. 3 is a diagram of one embodiment of a process for establishing an MPTCP connection.

FIG. 3 is a diagram of one embodiment of a process for establishing an MPTCP connection. In this example, a connection is being established between a user device as a client 301 and a server 303. In the examples, a server 303 can have any number of interfaces (e.g., the server could have three interfaces: S_1, S_2 and S_3). Similarly, the client 301 can have any number of interfaces (e.g., a client with two interfaces: C_1 and C_2). The client 301 and server

303 can expose any number or combination of their respective interfaces. The interfaces can be exposed via Domain Name System (DNS) or similar technologies. At least one WireGuard virtual interface IP address and its associated public key are stored in the DNS. In some embodiments, additional WireGuard virtual interface information can be shared via using DNS-based Authentication of Named Entities (DANE) for the cryptographic parameters, i.e., alongside one interface IP address. In some embodiments, DNS Security Extensions (DNSSEC) can be used to augment DANE to expose relevant information related to WireGuard interfaces.

An MPTCP connection can be established between a client 301 and a server 303 using TCP handshaking where the client 301 initiates the connection by sending a synchronize (SYN) message that informs the server that the client is starting communication along with the sequence number of the first segment. In addition, the client 301 indicates that the client is MPTCP capable by including the MP_Capable bit. The server 303 responds with a SYN acknowledgement, which is a SYN message with the acknowledgement bits set and identification of the starting segment number. The client 301 similarly sends an acknowledgement (ACK) that establishes the connection and enables data transfer. For example, a first TCP connection can be established between the client 301 and the server 303 using C_1 and S_1 interfaces.

In some embodiments, the secure MPTCP can establish a WireGuard or similar tunnel prior to the establishment of the MPTCP as discussed further herein below in relation to FIGS. 9 and 10. By creating a WireGuard VPN tunnel between the two WireGuard interfaces of the client 301 and server 303 prior to initiating an MPTCP session, MPTCP connection establishment signaling will be fully encrypted and secure.

Figure 4:
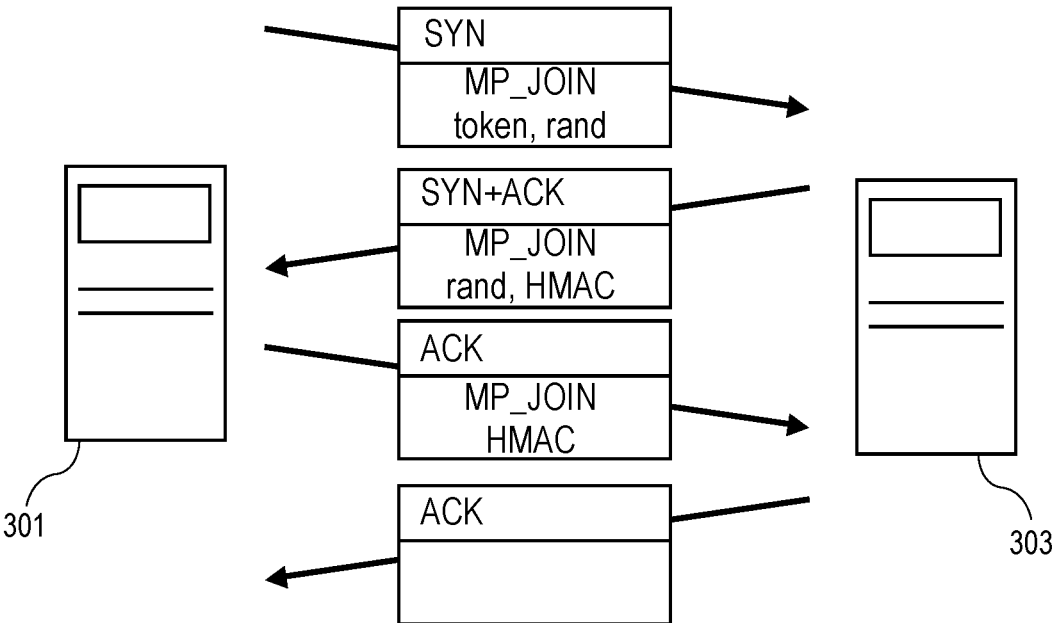
FIG. 4 is a diagram of one embodiment of a process for establishing an additional flow and path for an MPTCP connection.

FIG. 4 is a diagram of one embodiment of a process for establishing an additional flow and path for an MPTCP connection. The process of adding a sub-flow to an MPTCP connection can follow the creation of a separate WireGuard VPN by the secure MPTCP as discussed further in reference to FIGS. 9 and 10. The additional sub-flow can be initiated by the client 301 sending a SYN message with an initial segment sequence number to the server 303 along with additional indicators including an MP_JOIN, token (generated from a key of the client), random number (nonce). In response the server sends a SYN and ACK message with the MP_JOIN indicator along with a random number (nonce) and a hash-based message authentication code (HMAC) that uses the keys exchanged in the MPTCP connection establishment handshake process. The client 301 responds with an acknowledgement (ACK) that includes the MP_JOIN indicator and an HMAC. The server 303 completes the establishment of the sub flow.

Figure 5:
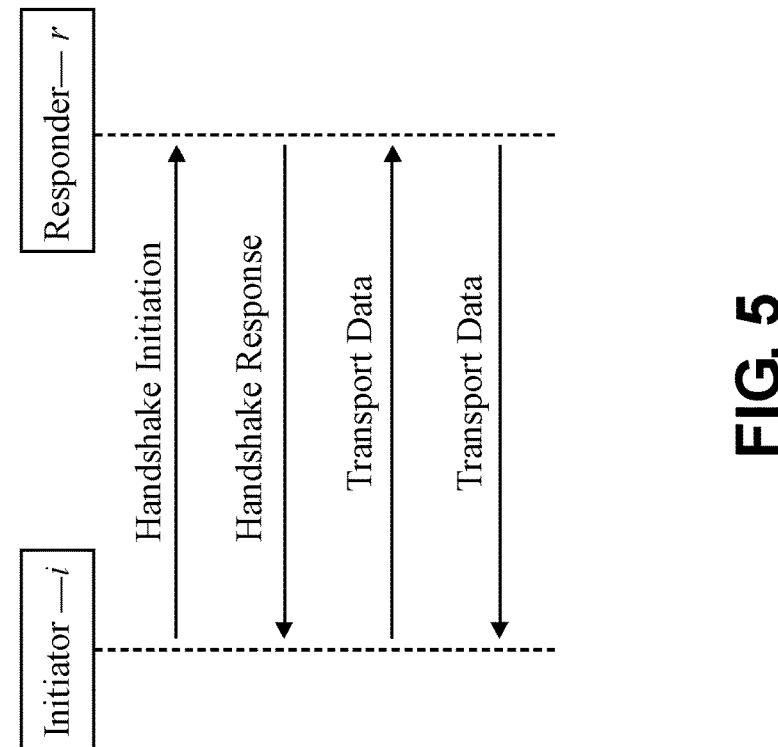
FIG. 5 is a diagram of one embodiment of a process for a WireGuard tunnel connection handshake process.

FIG. 5 is a diagram of one embodiment of a process for a WireGuard tunnel connection handshake process. The process of establishing a WireGuard tunnel can be initiated by any electronic device that supports WireGuard where the destination of the tunnel also supports WireGuard. Each of the electronic devices, the initiator and responder, can exchange cryptographic parameters (e.g., public and/or pre-shared keys). The initiator sends a handshake initiation message, which includes the peer's public key. The responder replies with its public key and computes shared secrets, after which the secure tunnel can be established to transport encrypted data between the initiator and responder.

Figure 6:
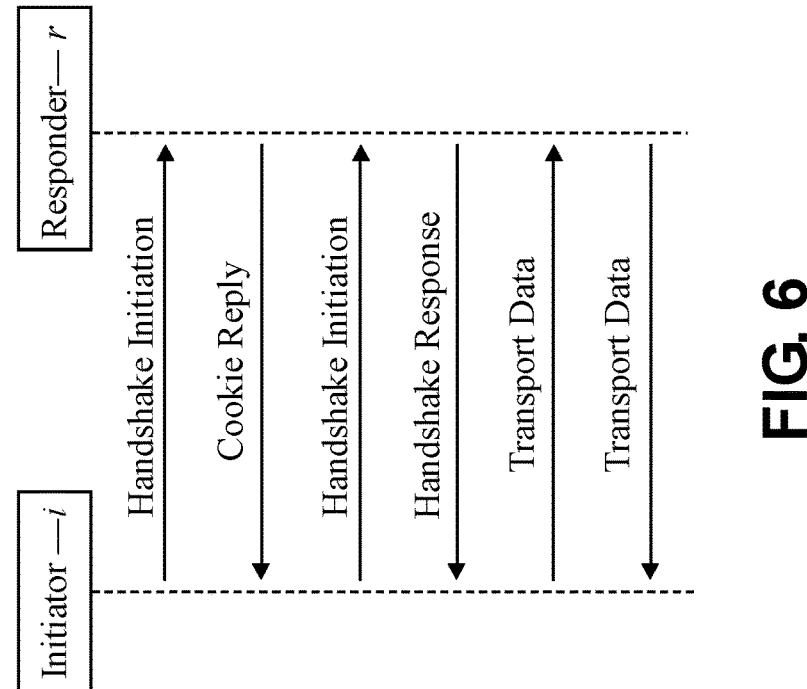
FIG. 6 is a diagram of another embodiment of a process for a WireGuard tunnel connection handshake process.

FIG. 6 is a diagram of another embodiment of a process for a WireGuard tunnel connection handshake process. Similar to the process of FIG. 5, except that a cookie is returned by the responder to avoid the compute intensive process of generating a session key by the responder and to thereby minimize the ability of initiators to overwhelm the responder with requests that may slow the responder with the generation of the session keys.

Figure 7:
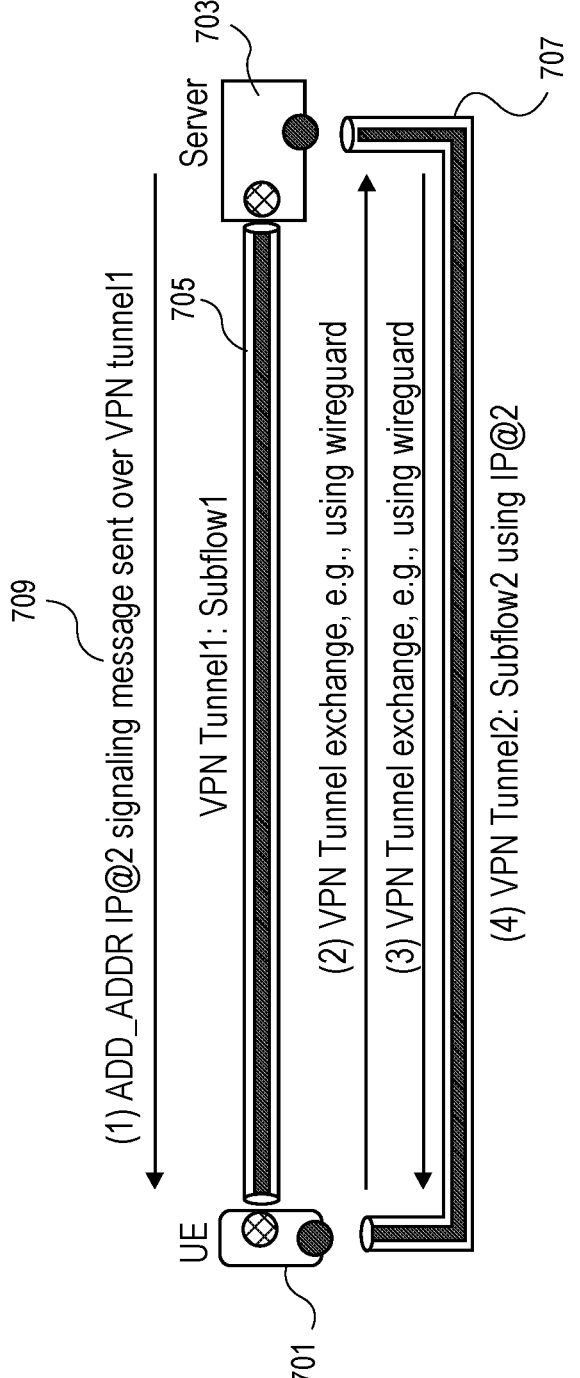
FIG. 7 is a diagram of one embodiment of a process for establishing an added sub-flow for the MPTCP connection in connection with a WireGuard tunnel.

FIG. 7 is a diagram of one embodiment of a process for establishing an added sub-flow for the MPTCP connection in connection with a WireGuard tunnel. In this example embodiment, a VPN tunnel 705 is established between a user equipment 701 and a server 703. The VPN tunnel 705 is utilized by the secure MPTCP to establish a first sub-flow between the user equipment 701 and the server 703. The user equipment 701 and server 703 can continue to utilize the first sub-flow and VPN tunnel 705 as long as there is data traffic to be exchanged for the MPTCP connection.

Figure 8:
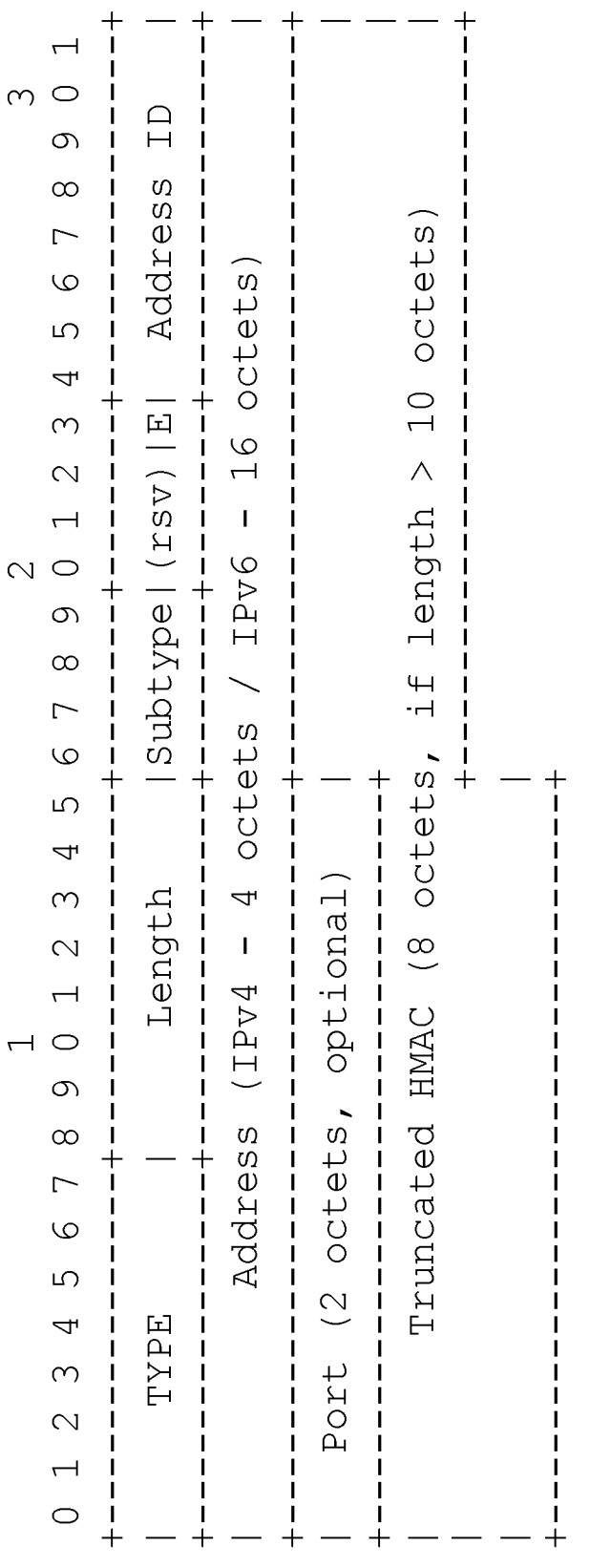
FIG. 8 is a message format of one example embodiment of a message for adding a sub-flow in MPTCP.

At any point either the secure MPTCP at the user equipment 701 or the secure MPTCP at the server 703 can request to add a second sub-flow. In some embodiments, the secure MPTCP that initiates the additional sub-flow can send an ADD_ADDR option in a TCP message over the first VPN tunnel 705 or by using a similar mechanism (step (1)). The ADD_ADDR option format is shown in FIG. 8. In response to receiving the ADD_ADDR option and message, the secure MPTCP at the recipient and the sender can establish a new VPN tunnel 707 between the user equipment 701 and the server 703. The secure MPTCP at each end of the tunnel can then establish the second sub-flow over the second VPN tunnel 707 by exchanging messages over the established WireGuard tunnel (steps (2) and (3)).

Once the second VPN tunnel 707 is established then the secure MPTCP at the user equipment 701 and/or server 703 can establish a new path as a TCP connection over the second VPN tunnel (step (4)). The traffic of the MPTCP connection can then be divided between the first sub-flow and the second sub-flow using any load or flow distribution process or algorithm.

The process of adding further sub-flows can be repeated at any frequency to add any number of different VPN tunnels and sub-flow paths, which can securely increase the bandwidth of the MPTCP connection between the user equipment 701 and the server 703.

FIG. 8 is a message format of one example embodiment of a message for adding a sub-flow in MPTCP. The ADD_ADDR can include a set of fields including Type, Length, Subtype, (rsv) E, Address ID, Address, Port, Truncated HMAC, and similar fields. The 'Type' field indicates the type of the message (e.g., MPTCP), the 'length' field indicates the size of the message, and the 'subtype' further defines the type of the message (e.g., an add address option). The (rsv) E field indicates traffic control information. The Address ID can uniquely identify the address within a connection. The Address is an IPv4 or IPv6 address of the interface for the sub-flow to be added. The port is the port of the sub-flow to be added. The truncated HMAC can be the rightmost 64 bits of the HMAC for the sub-flow.

FIG. 9 is a flowchart of one embodiment of a process of a user device for managing multipath communication. The process illustrated is of a user equipment that processes a request to add a sub-flow from the server. While the example is provided of a user equipment connected with a server, the MPTCP connection can be between any two electronic devices that support MPTCP. The process can be implemented by a secure MPTCP at the user equipment.

The process can be initiated to establish a MPTCP connection between the user equipment and the server. A first VPN tunnel can be established using WireGuard or a similar protocol (Block 901). MPTCP handshaking can be completed, as described herein, using the first VPN tunnel (Block 903). The MPTCP handshaking results in the establishment of a first sub-flow over the first VPN tunnel. The process can end at this point or hold until triggered by the receipt of a MPTCP message requesting a new sub-flow (e.g., with the ADD_ADDR option).

If at any point a message requesting a further sub-flow is received (e.g., a message with the ADD_ADDR option) (Block 905), then the process can continue by sending a reply. The request message can include a WireGuard interface address (i.e., an IP address for a second VPN tunnel to be established), along with a public key (of the server), and an indicator that WireGuard or a similar protocol is to be used for security. The reply message (e.g., with an ADD_ADDR option) can also include a public key (of the user equipment). These messages are exchanged over the first VPN tunnel (Block 907).

The secure MPTCP establishes the second WireGuard VPN tunnel using the exchange address information and keys (Block 909). Once the second VPN tunnel is established, then the second sub-flow can be established in the second VPN tunnel (Block 911). The traffic of the MPTCP connection can then be sub-divided in any manner using the two established sub-flows. The process can end at this point or hold until triggered by the receipt of a MPTCP message requesting a new sub-flow (e.g., with the ADD_ADDR option) (Block 913). In addition, the secure MPTCP can monitor each sub-flow of the MPTCP connection for usage and tear down a VPN tunnel and terminate an associated sub-flow when the sub-flow becomes inactive (Block 915). Any metric can be utilized to identify an inactive sub-flow including detecting a period of inactivity of any length.

FIG. 10 is a flowchart of one embodiment of a process of a server for managing multipath communication. The process illustrated is of a server that initiates a request to add a sub-flow that is sent to a user equipment. While the example is provided of a user equipment connected with a server, the MPTCP connection can be between any two electronic devices that support MPTCP. The process can be implemented by a secure MPTCP at the server.

The process can be initiated to establish a MPTCP connection between the user equipment and the server. A first VPN tunnel can be established using WireGuard or a similar protocol (Block 1001). MPTCP handshaking can be completed, as described herein, using the first VPN tunnel (Block 1003). The MPTCP handshaking results in the establishment of a first sub-flow over the first VPN tunnel. The process can end at this point or hold until triggered by the receipt or sending of a MPTCP message requesting a new sub-flow (e.g., with the ADD_ADDR option).

If at any point a message requesting a further sub-flow is received (e.g., a message with the ADD_ADDR option) or generated and sent (Block 1005), then the process can continue by sending a reply or awaiting the receipt of the reply. The request message can include a WireGuard interface address (i.e., an IP address for a second VPN tunnel to be established), along with a public key (of the server), and an indicator that WireGuard or a similar protocol is to be used for security. The reply message (e.g., with an ADD_ADDR option) can also include a public key (of the user equipment). These messages are exchanged over the first VPN tunnel (Block 1007).

The secure MPTCP establishes the second WireGuard VPN tunnel using the exchange address information and keys (Block 1009). Once the second VPN tunnel is established, then the second sub-flow can be established in the second VPN tunnel (Block 1011). The traffic of the MPTCP connection can then be sub-divided in any manner using the two established sub-flows. The process can end at this point or hold until triggered by the sending or receipt of a MPTCP message requesting a new sub-flow (e.g., with the ADD_ADDR option) (Block 1013). In addition, the secure MPTCP can monitor each sub-flow of the MPTCP connection for usage and tear down a VPN tunnel and terminate an associated sub-flow when the sub-flow becomes inactive (Block 1015). Any metric can be utilized to identify an inactive sub-flow including detecting a period of inactivity of any length.

The embodiments provide a process of a secure MPTCP to enable the secure addition of sub-flows once the MPTCP session has been established and data packets are exchanged between client and server. Initially, a TCP-like session is established between a client and server using a client interface and a server interface.

The embodiments enable the creation of new "on-demand" WireGuard interface(s) to be used to establish additional VPN tunnels, based on MPTCP signaling used to negotiate additional sub-flows. These new sub-flows will leverage other interfaces on both endpoints. The signaling to establish each VPN tunnel and each sub-flow is fully protected as it goes through the VPN tunnel.

When a server decides to add new sub-flow(s) to the ongoing MPTCP session, it will signal new IP address(es) to the client using the ADD_ADDR option (and eventually a new public key). This option can also carry the WireGuard interface associated with the IP address (and eventually the associated public key). The server will create a WireGuard virtual interface prior to sending the signaling message. If a client accepts to use the new IP address, the client will set up a VPN tunnel between the two virtual interfaces and perform an encrypted MPTCP handshake using the new IP address provided. A new and encrypted sub-flow will be added to the ongoing session.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between 1100A-1100B, 1100B-1100C, 1100C-1100D, 1100D-1100E, 1100E-1100F, 1100F-1100G, and 1100A-1100G, as well as between 1100H and each of 1100A, 1100C, 1100D, and 1100G. These NDs are physical devices, and the connectivity between these NDs can be wireless or wired (often referred to as a link). An additional line extending from NDs 1100A, 1100E, and 1100F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated circuits (ASICs) and a special-purpose operating system (OS); and 2) a general purpose network device 1104 that uses common off-the-shelf (COTS) processors and a standard OS.

The special-purpose network device 1102 includes networking hardware 1110 comprising a set of one or more processor(s) 1112, forwarding resource(s) 1114 (which typically include one or more ASICs and/or network processors), and physical network interfaces (NIs) 1116 (through which network connections are made, such as those shown by the connectivity between NDs 1100A-H), as well as non-transitory machine readable storage media 1118 having stored therein networking software 1120. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

In some embodiments, the networking software 1120 can include the secure MPTCP component 1165. The secure MPTCP component 1165 can be code, instructions, or similar software that implements the processes described herein to establish a secure MPTCP connection and enable the secure addition of sub-flows, each in a separate VPN tunnel.

The special-purpose network device 1102 is often physically and/or logically considered to include: 1) a ND control plane 1124 (sometimes referred to as a control plane) comprising the processor(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the processor(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and physical NIs 1146, as well as non-transitory machine readable storage media 1148 having stored therein software 1150. During operation, the processor(s) 1142 execute the software 1150 to instantiate one or more sets of one or more applications 1164A-R. While one embodiment does not implement virtualization, alternative embodiments may use different forms of virtualization. For example, in one such alternative embodiment the virtualization layer 1154 represents the kernel of an operating system (or a shim executing on a base operating system) that allows for the creation of multiple instances 1162A-R called software containers that may each be used to execute one (or more) of the sets of applications 1164A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1154 represents a hypervisor (sometimes referred to as a virtual machine monitor (VMM)) or a hypervisor executing on top of a host operating system, and each of the sets of applications 1164A-R is run on top of a guest operating system within an instance 1162A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1140, directly on a hypervisor (in which case the unikernel is sometimes described as running within a LibOS virtual machine), or in a software container, embodiments can be implemented fully with unikernels running directly on a hypervisor represented by virtualization layer 1154, unikernels running within software containers represented by instances 1162A-R, or as a combination of unikernels and the above-described techniques (e.g., unikernels and virtual machines both run directly on a hypervisor, unikernels and sets of applications that are run in different software containers).

In some embodiments, the software 1150 can include the secure MPTCP component 1165. The secure MPTCP component 1165 can be code, instructions, or similar software that implements the processes described herein to establish a secure MPTCP connection and enable the secure addition of sub-flows, each in a separate VPN tunnel.

The instantiation of the one or more sets of one or more applications 1164A-R, as well as virtualization if implemented, are collectively referred to as software instance(s) 1152. Each set of applications 1164A-R, corresponding virtualization construct (e.g., instance 1162A-R) if implemented, and that part of the hardware 1140 that executes them (be it hardware dedicated to that execution and/or time slices of hardware temporally shared), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1162A-R to VNEs also apply to embodiments where such a finer level of granularity and/or unikernels are used.

In certain embodiments, the virtualization layer 1154 includes a virtual switch that provides similar forwarding services as a physical Ethernet switch. Specifically, this virtual switch forwards traffic between instances 1162A-R and the physical NI(s) 1146, as well as optionally between the instances 1162A-R; in addition, this virtual switch may enforce network isolation between the VNEs 1160A-R that by policy are not permitted to communicate with each other (e.g., by honoring virtual local area networks (VLANs)).

The third exemplary ND implementation in FIG. 11A is a hybrid network device 1106, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 11C illustrates various exemplary ways in which VNEs may be coupled according to some embodiments of the invention. FIG. 11C shows VNEs 1170A.1-1170A.P (and optionally VNEs 1170A.Q-1170A.R) implemented in ND 1100A and VNE 1170H.1 in ND 1100H. In FIG. 11C, VNEs 1170A.1-P are separate from each other in the sense that they can receive packets from outside ND 1100A and forward packets outside of ND 1100A; VNE 1170A.1 is coupled with VNE 1170H.1, and thus they communicate packets between their respective NDs; VNE 1170A.2-1170A.3 may optionally forward packets between themselves without forwarding them outside of the ND 1100A; and VNE 1170A.P may optionally be the first in a chain of VNEs that includes VNE 1170A.Q followed by VNE 1170A.R (this is sometimes referred to as dynamic service chaining, where each of the VNEs in the series of VNEs provides a different service—e.g., one or more layer 4-7 network services). While FIG. 11C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software instances 1162A-R may operate as servers; the same would be true for the hybrid network device 1106; in the case of the special-purpose network device 1102, one or more such servers could also be run on a virtualization layer executed by the processor(s) 1112); in which case the servers are said to be co-located with the VNEs of that ND.

A virtual network is a logical abstraction of a physical network (such as that in FIG. 11A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

FIG. 11D illustrates a network with a single network element on each of the NDs of FIG. 11A, and within this straightforward approach contrasts a traditional distributed approach (commonly used by traditional routers) with a centralized approach for maintaining reachability and forwarding information (also called network control), according to some embodiments of the invention. Specifically, FIG. 11D illustrates network elements (NEs) 1170A-H with the same connectivity as the NDs 1100A-H of FIG. 11A.

FIG. 11D illustrates that the distributed approach 1172 distributes responsibility for generating the reachability and forwarding information across the NEs 1170A-H; in other words, the process of neighbor discovery and topology discovery is distributed.

For example, where the special-purpose network device 1102 is used, the control communication and configuration module(s) 1132A-R of the ND control plane 1124 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1170A-H (e.g., the processor(s) 1112 executing the control communication and configuration module(s) 1132A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1124. The ND control plane 1124 programs the ND forwarding plane 1126 with information (e.g., adjacency and route information) based on the routing structure(s). For example, the ND control plane 1124 programs the adjacency and route information into one or more forwarding table(s) 1134A-R (e.g., Forwarding Information Base (FIB), Label Forwarding Information Base (LFIB), and one or more adjacency structures) on the ND forwarding plane 1126. For layer 2 forwarding, the ND can store one or more bridging tables that are used to forward data based on the layer 2 information in that data. While the above example uses the special-purpose network device 1102, the same distributed approach 1172 can be implemented on the general purpose network device 1104 and the hybrid network device 1106.

FIG. 11D illustrates that a centralized approach 1174 (also known as software defined networking (SDN)) that decouples the system that makes decisions about where traffic is sent from the underlying systems that forwards traffic to the selected destination. The illustrated centralized approach 1174 has the responsibility for the generation of reachability and forwarding information in a centralized control plane 1176 (sometimes referred to as a SDN control module, controller, network controller. OpenFlow controller, SDN controller, control plane node, network virtualization authority, or management control entity), and thus the process of neighbor discovery and topology discovery is centralized. The centralized control plane 1176 has a south bound interface 1182 with a data plane 1180 (sometime referred to the infrastructure layer, network forwarding plane, or forwarding plane (which should not be confused with a ND forwarding plane)) that includes the NEs 1170A-H (sometimes referred to as switches, forwarding elements, data plane elements, or nodes). The centralized control plane 1176 includes a network controller 1178, which includes a centralized reachability and forwarding information module 1179 that determines the reachability within the network and distributes the forwarding information to the NEs 1170A-H of the data plane 1180 over the south bound interface 1182 (which may use the OpenFlow protocol). Thus, the network intelligence is centralized in the centralized control plane 1176 executing on electronic devices that are typically separate from the NDs.

For example, where the special-purpose network device 1102 is used in the data plane 1180, each of the control communication and configuration module(s) 1132A-R of the ND control plane 1124 typically include a control agent that provides the VNE side of the south bound interface 1182. In this case, the ND control plane 1124 (the processor(s) 1112 executing the control communication and configuration module(s) 1132A-R) performs its responsibility for participating in controlling how data (e.g., packets) is to be routed (e.g., the next hop for the data and the outgoing physical NI for that data) through the control agent communicating with the centralized control plane 1176 to receive the forwarding information (and in some cases, the reachability information) from the centralized reachability and forwarding information module 1179 (it should be understood that in some embodiments of the invention, the control communication and configuration module(s) 1132A-R, in addition to communicating with the centralized control plane 1176, may also play some role in determining reachability and/or calculating forwarding information—albeit less so than in the case of a distributed approach; such embodiments are generally considered to fall under the centralized approach 1174, but may also be considered a hybrid approach).

While the above example uses the special-purpose network device 1102, the same centralized approach 1174 can be implemented with the general purpose network device 1104 (e.g., each of the VNE 1160A-R performs its responsibility for controlling how data (e.g., packets) is to be routed (e.g., the next hop for the data and the outgoing physical NI for that data) by communicating with the centralized control plane 1176 to receive the forwarding information (and in some cases, the reachability information) from the centralized reachability and forwarding information module 1179; it should be understood that in some embodiments of the invention, the VNEs 1160A-R, in addition to communicating with the centralized control plane 1176, may also play some role in determining reachability and/or calculating forwarding information—albeit less so than in the case of a distributed approach) and the hybrid network device 1106. In fact, the use of SDN techniques can enhance the NFV techniques typically used in the general purpose network device 1104 or hybrid network device 1106 implementations as NFV is able to support SDN by providing an infrastructure upon which the SDN software can be run, and NFV and SDN both aim to make use of commodity server hardware and physical switches.

FIG. 11D also shows that the centralized control plane 1176 has a north bound interface 1184 to an application layer 1186, in which resides application(s) 1188. The centralized control plane 1176 has the ability to form virtual networks 1192 (sometimes referred to as a logical forwarding plane, network services, or overlay networks (with the NEs 1170A-H of the data plane 1180 being the underlay network)) for the application(s) 1188. Thus, the centralized control plane 1176 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

In some embodiments, the network controller 1178 of similar component of the centralized approach 1174 can include the secure MPTCP component 1181. The secure MPTCP component 1181 can be code, instructions, or similar software that implements the processes described herein to establish a secure MPTCP connection and enable the secure addition of sub-flows, each in a separate VPN tunnel.

While FIG. 11D shows the distributed approach 1172 separate from the centralized approach 1174, the effort of network control may be distributed differently or the two combined in certain embodiments of the invention. For example: 1) embodiments may generally use the centralized approach (SDN) 1174, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1174, but may also be considered a hybrid approach.

While FIG. 11D illustrates the simple case where each of the NDs 1100A-H implements a single NE 1170A-H, it should be understood that the network control approaches described with reference to FIG. 11D also work for networks where one or more of the NDs 1100A-H implement multiple VNEs (e.g., VNEs 1130A-R. VNEs 1160A-R, those in the hybrid network device 1106). Alternatively or in addition, the network controller 1178 may also emulate the implementation of multiple VNEs in a single ND. Specifically, instead of (or in addition to) implementing multiple VNEs in a single ND, the network controller 1178 may present the implementation of a VNE/NE in a single ND as multiple VNEs in the virtual networks 1192 (all in the same one of the virtual network(s) 1192, each in different ones of the virtual network(s) 1192, or some combination). For example, the network controller 1178 may cause an ND to implement a single VNE (a NE) in the underlay network, and then logically divide up the resources of that NE within the centralized control plane 1176 to present different VNEs in the virtual network(s) 1192 (where these different VNEs in the overlay networks are sharing the resources of the single VNE/NE implementation on the ND in the underlay network).

On the other hand, FIGS. 11E and 11F respectively illustrate exemplary abstractions of NEs and VNEs that the network controller 1178 may present as part of different ones of the virtual networks 1192. FIG. 11E illustrates the simple case of where each of the NDs 1100A-H implements a single NE 1170A-H (see FIG. 11D), but the centralized control plane 1176 has abstracted multiple of the NEs in different NDs (the NEs 1170A-C and G-H) into (to represent) a single NE 11701 in one of the virtual network(s) 1192 of FIG. 11D, according to some embodiments of the invention. FIG. 11E shows that in this virtual network, the NE 11701 is coupled to NE 1170D and 1170F, which are both still coupled to NE 1170E.

FIG. 11F illustrates a case where multiple VNEs (VNE 1170A.1 and VNE 1170H.1) are implemented on different NDs (ND 1100A and ND 1100H) and are coupled to each other, and where the centralized control plane 1176 has abstracted these multiple VNEs such that they appear as a single VNE 1170T within one of the virtual networks 1192 of FIG. 11D, according to some embodiments of the invention. Thus, the abstraction of a NE or VNE can span multiple NDs.

While some embodiments of the invention implement the centralized control plane 1176 as a single entity (e.g., a single instance of software running on a single electronic device), alternative embodiments may spread the functionality across multiple entities for redundancy and/or scalability purposes (e.g., multiple instances of software running on different electronic devices).

Figure 12:
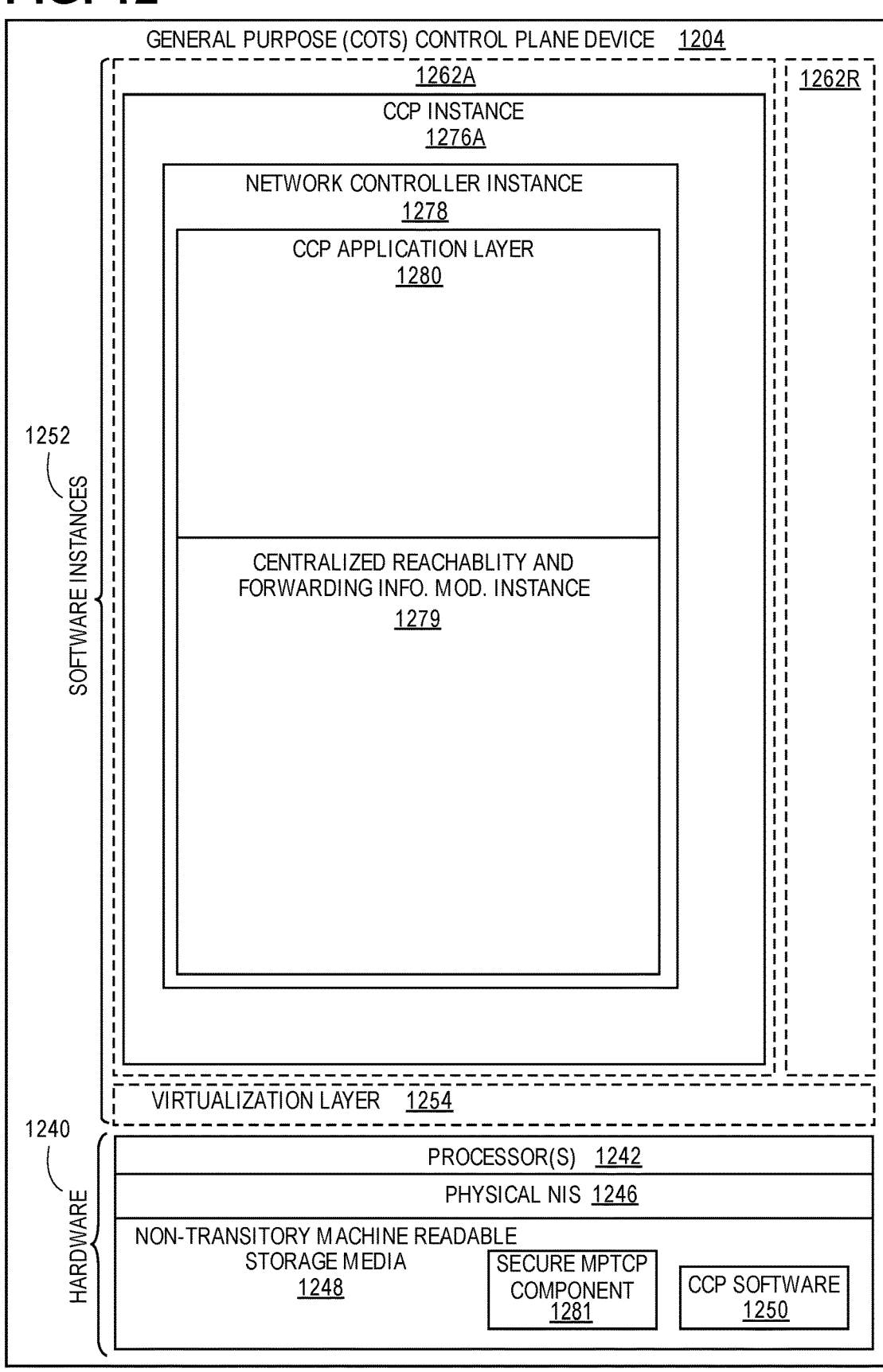
FIG. 12 illustrates a general purpose control plane device with centralized control plane (CCP) software 1250), according to some embodiments of the invention.

Similar to the network device implementations, the electronic device(s) running the centralized control plane 1176, and thus the network controller 1178 including the centralized reachability and forwarding information module 1179, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 12 illustrates, a general purpose control plane device 1204 including hardware 1240 comprising a set of one or more processor(s) 1242 (which are often COTS processors) and physical NIs 1246, as well as non-transitory machine readable storage media 1248 having stored therein centralized control plane (CCP) software 1250.

In some embodiments, the control plane device 1204 or a component thereof can include the secure MPTCP component 1281. The secure MPTCP component 1281 can be code, instructions, or similar software that implement the processes described herein to establish a secure MPTCP connection and enable the secure addition of sub-flows, each in a separate VPN tunnel. The secure MPTCP component 1281 can be stored in the non-transitory machine readable storage media.

In embodiments that use compute virtualization, the processor(s) 1242 typically execute software to instantiate a virtualization layer 1254 (e.g., in one embodiment the virtualization layer 1254 represents the kernel of an operating system (or a shim executing on a base operating system) that allows for the creation of multiple instances 1262A-R called software containers (representing separate user spaces and also called virtualization engines, virtual private servers, or jails) that may each be used to execute a set of one or more applications; in another embodiment the virtualization layer 1254 represents a hypervisor (sometimes referred to as a virtual machine monitor (VMM)) or a hypervisor executing on top of a host operating system, and an application is run on top of a guest operating system within an instance 1262A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1240, directly on a hypervisor represented by virtualization layer 1254 (in which case the unikernel is sometimes described as running within a LibOS virtual machine), or in a software container represented by one of instances 1262A-R). Again, in embodiments where compute virtualization is used, during operation an instance of the CCP software 1250 (illustrated as CCP instance 1276A) is executed (e.g., within the instance 1262A) on the virtualization layer 1254. In embodiments where compute virtualization is not used, the CCP instance 1276A is executed, as a unikernel or on top of a host operating system, on the "bare metal" general purpose control plane device 1204. The instantiation of the CCP instance 1276A, as well as the virtualization layer 1254 and instances 1262A-R if implemented, are collectively referred to as software instance(s) 1252.

In some embodiments, the CCP instance 1276A includes a network controller instance 1278. The network controller instance 1278 includes a centralized reachability and forwarding information module instance 1279 (which is a middleware layer providing the context of the network controller 1178 to the operating system and communicating with the various NEs), and an CCP application layer 1280 (sometimes referred to as an application layer) over the middleware layer (providing the intelligence required for various network operations such as protocols, network situational awareness, and user-interfaces). At a more abstract level, this CCP application layer 1280 within the centralized control plane 1176 works with virtual network view(s) (logical view(s) of the network) and the middleware layer provides the conversion from the virtual networks to the physical view.

The centralized control plane 1176 transmits relevant messages to the data plane 1180 based on CCP application layer 1280 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1180 may receive different messages, and thus different forwarding information. The data plane 1180 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1180, the packet (or a subset of the packet header and content) is typically forwarded to the centralized control plane 1176. The centralized control plane 1176 will then program forwarding table entries into the data plane 1180 to accommodate packets belonging to the flow of the unknown packet. Once a specific forwarding table entry has been programmed into the data plane 1180 by the centralized control plane 1176, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a server to establish secure multipath communications between the server and a user device, the method comprising:

establishing a first WireGuard connection with the user device to establish a first path between the server and the user device using a first WireGuard virtual private network (VPN) tunnel;

establishing a first sub flow of a multipath transmission control protocol (MPTCP) with the user device on the first path using the first WireGuard VPN tunnel to encapsulate the first sub flow;

sending a message to initiate a second WireGuard VPN tunnel between the server and the user device to establish a second path, the message including a WireGuard interface address, public key for the server, and WireGuard indicator which indicates that the server supports WireGuard to secure MPTCP paths with a WireGuard VPN;

receiving a reply message with a public key for the user device; and establishing a second sub flow of the MPTCP with the user device using the second WireGuard VPN tunnel to encapsulate the second sub flow.

2. The method of claim 1, further comprising:

establishing a third path for a third sub flow of the MPTCP with the user device using a third WireGuard VPN tunnel to encapsulate the third sub flow.

3. The method of claim 1, further comprising:

determining that the second sub flow is inactive; and tearing down the second WireGuard VPN tunnel in response to determining that the second sub flow is inactive.

4. The method of claim 1, wherein the message includes an add address option of MPTCP.

5. An electronic device comprising:

a machine-readable storage medium having stored therein a secure multipath transmission control protocol (MPTCP) component; and a set of processors coupled to the machine-readable storage medium, wherein at least one of the set of processors to execute the secure MPTCP component to cause the electronic device to:

establish a first WireGuard connection with a user device to establish a first path between a server and the user device using a first WireGuard virtual private network (VPN) tunnel;

establish a first sub flow of a multipath transmission control protocol (MPTCP) between the server and the user device on the first path using the first WireGuard-VPN tunnel to encapsulate the first sub flow;

send a message to initiate a second WireGuard VPN tunnel between the server and the user device to establish a second path, the message including a WireGuard interface address, public key for the server, and WireGuard indicator which indicates that the server supports WireGuard to secure MPTCP paths with a WireGuard VPN;

receive a reply message with a public key for the user device; and establish a second sub flow of the MPTCP with between the server and the user device using the second WireGuard VPN tunnel to encapsulate the second sub flow.

6. The electronic device of claim 5, further to:

establish a third path for a third sub flow of the MPTCP with between the server and the user device using a third WireGuard VPN tunnel to encapsulate the third sub flow.

7. The electronic device of claim 5, further to:

determine that the second sub flow is inactive; and tearing down the second WireGuard VPN tunnel in response to a determination that the second sub flow is inactive.

8. The electronic device of claim 5, wherein the message includes an add address option of MPTCP.

9. A method of a user device to establish secure multipath communications between a server and the user device, the method comprising:

establishing a first WireGuard connection with the server to establish a first path between the server and the user device using a first WireGuard virtual private network (VPN) tunnel;

establishing a first sub flow of a multipath transmission control protocol (MPTCP) with the server on the first path using the first WireGuard VPN tunnel to encapsulate the first sub flow;

receiving a message to initiate a second WireGuard VPN tunnel between the server and the user device to establish a second path, the message including a WireGuard interface address, public key for the server, and WireGuard indicator which indicates that the server supports WireGuard to secure MPTCP paths with a WireGuard VPN;

sending a reply message with a public key for the user device; and establishing a second sub flow of the MPTCP with the server using the second WireGuard VPN tunnel to encapsulate the second sub flow.

10. The method of claim 9, further comprising:

establishing a third path for a third sub flow of the MPTCP with the server using a third WireGuard VPN tunnel to encapsulate the third sub flow.

11. The method of claim 9, further comprising:

determining that the second sub flow is inactive; and tearing down the second WireGuard VPN tunnel in response to determining that the second sub flow is inactive.

12. The method of claim 9, wherein the message includes an add address option of MPTCP.

13. An electronic device comprising:

a machine-readable storage medium having stored therein a secure multipath transmission control protocol (MPTCP) component; and a set of processors coupled to the machine-readable storage medium, wherein at least one of the set of processors to execute the secure MPTCP component to cause the electronic device to:

establish a first WireGuard connection with a server to establish a first path between the server and a user device using a first WireGuard virtual private network (VPN) tunnel;

establish a first sub flow of a multipath transmission control protocol (MPTCP) between the server and the user device using the first WireGuard VPN tunnel to encapsulate the first sub flow;

receive a message to initiate a second WireGuard VPN tunnel between the server and a user device to establish a second path, the message including a WireGuard interface address, public key for the server, and WireGuard indicator which indicates that the server supports WireGuard to secure MPTCP paths with a WireGuard VPN;

send a reply message with a public key for the user device; and establish a second sub flow of the MPTCP with between the server and the user device using the second WireGuard VPN tunnel to encapsulate the second sub flow.

14. The electronic device of claim 13, further to:

establish a third path for a third sub flow of the MPTCP with between the server and the user device using a third WireGuard VPN tunnel to encapsulate the third sub flow.

15. The electronic device of claim 13, further to:

determine that the second sub flow is inactive; and tearing down the second WireGuard VPN tunnel in response to a determination that the second sub flow is inactive.

16. The electronic device of claim 13, wherein the message includes an add address option of MPTCP.

\* \* \* \* \*